United States Patent [19]

Inaga

[11] 4,178,685

[45] Dec. 18, 1979

[54] CHAIN SAW

[75] Inventor: Hisashi Inaga, Tokyo, Japan

[73] Assignee: Kioritz Corporation, Tokyo, Japan

[21] Appl. No.: 926,994

[22] Filed: Jul. 21, 1978

[30] Foreign Application Priority Data

Jul. 29, 1977 [JP] Japan ........................... 52-101778[U]

[51] Int. Cl.[2] ............................................ B23D 57/02

[52] U.S. Cl. ...................................................... 30/381

[58] Field of Search .................. 30/381, 382, 383, 384

[56] References Cited

U.S. PATENT DOCUMENTS

| | | | |
|---|---|---|---|
| 3,680,608 | 8/1972 | Emmerich | 30/381 |
| 3,845,557 | 11/1974 | Bailey | 30/381 |
| 3,934,344 | 1/1976 | Inaga | 30/381 |
| 3,994,067 | 11/1976 | Hazzard | 30/381 X |

FOREIGN PATENT DOCUMENTS

| | | | |
|---|---|---|---|
| 49818 | 12/1931 | Norway | 30/381 |

*Primary Examiner*—Jimmy C. Peters
*Attorney, Agent, or Firm*—Karl W. Flocks

[57] ABSTRACT

A chain saw driven by a two-cycle opposed cylinder engine of simultaneous ignition type. The vibration energies generated in respective cylinders are offset by each other partly because the cylinders are made to oppose to each other, and partly because the ignitions of these cylinders take place simultaneously. Further, the opposed cylinder engine provides ample spaces above and below the cylinders. These spaces are conveniently used for accommodating intake system including a carburetor and so forth and exhaust system including a muffler and so forth. Sound shielding walls are disposed in the ample space around the cylinders so as to insulate the noise caused by the engine and, at the same time, to define a sufficiently large cooling air passage.

2 Claims, 2 Drawing Figures

CHAIN SAW

BACKGROUND OF THE INVENTION

The present invention relates to a chain saw provided with a two-cycle opposed cylinder engine of simultaneous ignition type, having at least a pair of cylinders which are made to oppose to each other in back and forth direction.

Typical conventional chain saw has a two-cycle single cylinder engine and, therefore, sustains a vibration of a considerably large amplitude. Hitherto, various proposals and attempts have been made, in order to effectively suppress and damp the vibration. However, unfortunately, none of these proposals and attempts could provide a satisfactory vibration suppressing and damping effect.

BRIEF SUMMARY OF THE INVENTION

It is therefore an object of the invention to suppress the vibration of the engine itself, and to achieve a good vibration and noise suppression of the chain saw as a whole, thereby to overcome above stated problem of the prior art.

To this end, according to the invention, there is provided a chain saw having, as the prime mover, a two-cycle opposed cylinder engine of simultaneous ignition type. This arrangement conveniently allows a set off of the vibration energies of opposing cylinders and, at the same time, provides large spaces above and below these cylinders available for accommodating an intake system including a carburetor and so on, and an exhaust system including a muffler of a large capacity, to enhance the vibration damping effect. Further this arrangement affords a free design of the vibration damping construction. Thus, according to the invention, there is provided a chain saw having a novel overall vibration suppression and damping construction which effectively suppress the vibration of the engine as the vibration source, as well as a good vibration damping at the joint portions of the engine and the chain saw body.

It is another object of the invention to provide a chain saw provided with an opposed multi-cylinder engine as the prime mover, so as to preserve a large space around the cylinders, the space being surrounded by a large sound insulating wall which, on the other hand, defines an ample cooling air passage, so as to ensure a good vibration and noise suppression effect.

The above and other objects, as well as advantageous features of the invention will become more clear from the following description of the preferred embodiments taken in conjunction with the accompanying drawings.

DESCRIPTION OF THE PREFERRED EMBODIMENT

The invention will be described hereinafter with reference to the accompanying drawings which show a preferred embodiment. The chain saw of this embodiment has, although neglected from the drawings, a saw chain which extends forwardly from the right-hand side front end portion thereof.

Figure 1:
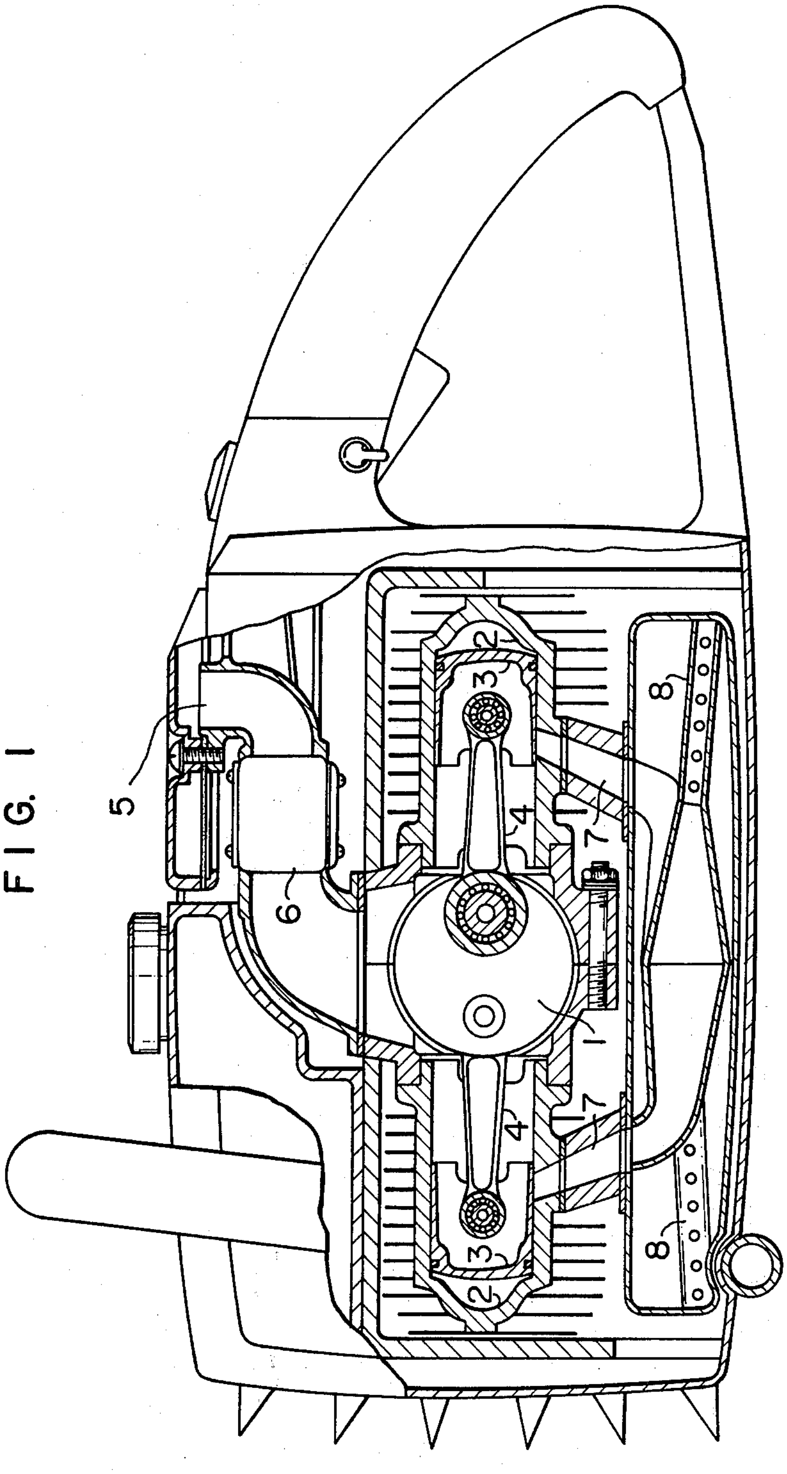
FIG. 1 is a side elevational view of a chain saw in accordance with the invention, showing an essential part of the chain saw in section.

Referring first to FIG. 1 showing partly in section the side elevation of the chain saw body, there is provided a single crank shaft 1 almost at the center of the chain saw body. At each side of the crank shaft 1, disposed is a cylinder 2 having a piston 3. These cylinders 2, 2 are made to oppose to each other and, although illustrated on the same plane, actually deviated from each other in the direction normal to the plane of the drawings, so that the connecting rods 4, 4, through which the pistons 3, 3 are connected to the common crank shaft 1, may not collide with each other.

This opposed cylinder engine is so-called simultaneous ignition type two-cycle engine in which the ignitions in both cylinders take place simultaneously.

This opposed cylinder type engine provides large spaces above and below the cylinders 2, 2. In the illustrated embodiment, an intake duct having an intake opening 5 and a carburetor 6 is disposed in the space above the cylinders, while an exhaust pipe having an exhaust opening 7 and a muffler 8 of a large capacity is accommodated by the space defined below the cylinders. Thus, according to the invention, large spaces for freely disposing the carburetor, intake opening, intake silencer, muffler and so forth are conveniently preserved, thanks to the opposing arrangement of the cylinders. This also offers various advantages such as an easier tuning of the muffler.

Furthermore, partly because the cylinders are made to oppose to each other, and partly because the ignitions in both cylinders take place simultaneously, the energies of the kinetic masses of the engine are conveniently balanced, so as to suppress the major part of vibration, while preserving an output power and performance equivalent or superior to the conventional two-cycle single cylinder engine having the same displacement. At the same time, the noise from the exhaust side is greatly suppressed thanks to the provision of the muffler of the larger capacity.

Figure 2:
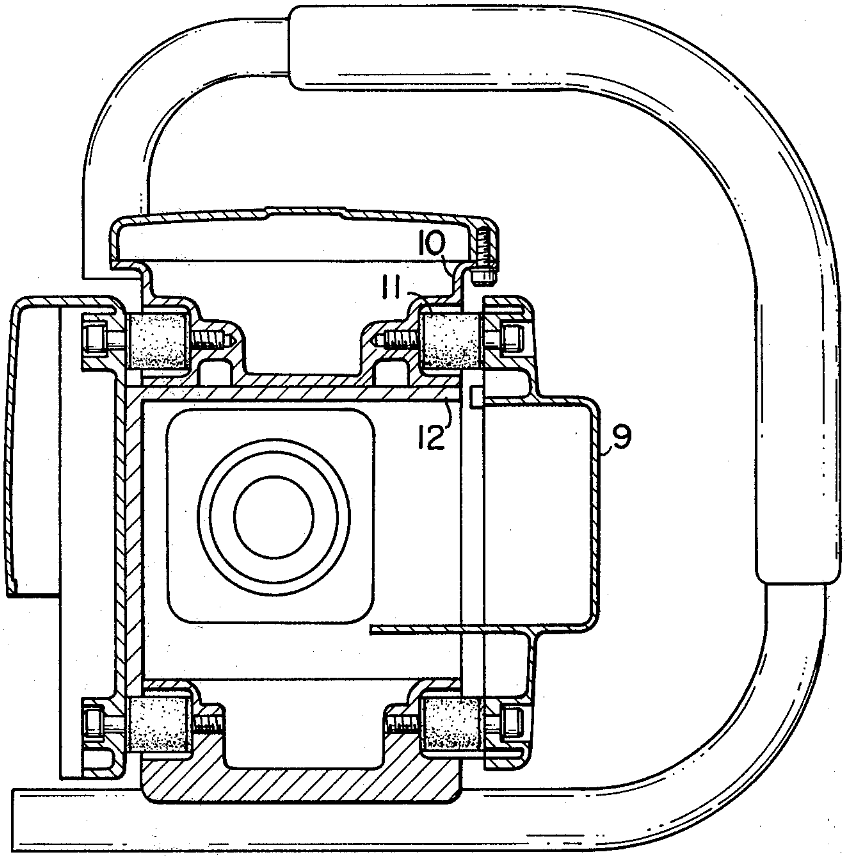
FIG. 2 is a schematic sectional view of a construction for interconnecting the engine and the body portion of the chain saw through a medium of vibration absorbing resilient member.

FIG. 2 shows the construction for fixing the engine section 9 and the main body section 10 of the chain saw, neglecting the other part of the chain saw. It will be seen that the engine section 9 and the main body section 10 are connected to each other through a medium of vibration absorbing resilient members 11. More specifically, as will be seen from FIG. 2, the engine section 9 has a substantially H-shaped cross-section having an upper and lower hollow portions. Parts of the main body section 10 are received by respective hollow portions of the engine section 9, with predetermined gaps left between the received parts of the main body section 10 and the walls of the hollow portion of the engine section 9. The aforementioned vibration-absorbing resilient members 11 are interposed between the confronting surfaces of the walls of the hollow portion of the engine section 9 and the received parts of the main body section 10.

Further, FIG. 2 shows sound insulating walls 12 provided at the upper and lateral sides of the cylinders. These sound insulating walls cover the portions of the engine section 9 other than the bottom and the cooling air passage. These sound insulating wall contributes, in combination with the muffler 8 of the increased capacity, to greatly lower the lever of the noise, to provide a "quiet" chain saw.

At the same time, the vibration of the chain saw is remarkably suppressed and damped owing to the combination of the two-cycle opposed cylinder engine of simultaneous ignition type and the connection between the engine section and the main body section of the chain saw including the vibration-absorbing resilient members disposed between the portions of the engine section and the main body section in the upper and lower hollow portions of the H-shaped cross-section of engine section.

What is claimed is:

1. A chain saw comprising: a two-cycle opposed cylinder engine of simultaneous ignition type, said engine having at least a pair of cylinders which are made to oppose to each other in the back and forth direction; an intake system disposed in the space above said engine and including a carburetor and so on; an exhaust system disposed in the space below said engine; and a main body section of the chain saw having chain-saw handling handles disposed in the back and forth direction, said main body section being connected to and held by opposite end portions of said engine section through vibration-absorbing resilient members.

2. A chain saw as set forth in claim 1, characterized by comprising a sound insulating wall disposed in the space surrounding said opposed cylinder engine.

* * * * *